United States Patent
Moodi et al.

(10) Patent No.: US 10,486,274 B2
(45) Date of Patent: Nov. 26, 2019

(54) TAPERED EXTRACTION DEVICE

(71) Applicant: The Boeing Company, Chicago, IL (US)

(72) Inventors: Mike M. Moodi, Bothell, WA (US); Paul A. Baker, Seattle, WA (US)

(73) Assignee: The Boeing Company, Chicago, IL (US)

( * ) Notice: Subject to any disclaimer, the term of this patent is extended or adjusted under 35 U.S.C. 154(b) by 757 days.

(21) Appl. No.: 15/056,667

(22) Filed: Feb. 29, 2016

(65) Prior Publication Data

US 2017/0246713 A1 Aug. 31, 2017

(51) Int. Cl.
| | |
|---|---|
| *B25B 27/06* | (2006.01) |
| *B29C 70/54* | (2006.01) |
| *B23P 19/02* | (2006.01) |
| *B29C 70/44* | (2006.01) |
| *B64F 5/10* | (2017.01) |

(52) U.S. Cl.
CPC ............ *B23P 19/025* (2013.01); *B25B 27/06* (2013.01); *B29C 70/446* (2013.01); *B29C 70/54* (2013.01); *B64F 5/10* (2017.01); *B23P 2700/01* (2013.01)

(58) Field of Classification Search
CPC ... B23P 19/025; B23P 2700/01; B23P 19/022; B64F 5/10; B29C 70/54; B29C 70/446; B25B 27/06; B25B 27/02
See application file for complete search history.

(56) References Cited

U.S. PATENT DOCUMENTS

| | | | |
|---|---|---|---|
| 4,161,810 A | * | 7/1979 | Beard ................... B23P 19/022 29/282 |
| 5,249,947 A | | 10/1993 | Inaba et al. |
| 5,745,968 A | | 5/1998 | Genest et al. |
| 2004/0061256 A1 | | 4/2004 | Bosshardt et al. |

FOREIGN PATENT DOCUMENTS

| | | |
|---|---|---|
| DE | 20111169 U1 | 10/2001 |
| DE | 202007007352 U1 | 8/2007 |
| WO | 8404358 A1 | 11/1984 |

OTHER PUBLICATIONS

Search Report for related European Application No. EP16201893.1; report dated May 26, 2017.

* cited by examiner

*Primary Examiner* — Jacob J Cigna
*Assistant Examiner* — Lee A Holly
(74) *Attorney, Agent, or Firm* — Miller, Matthias & Hull LLP

(57) ABSTRACT

A system for extracting an assembly component from an assembly uses an extractor that applies a gripping force around a perimeter of the assembly component, a coupler that applies an extraction force to the extractor and a tensioner fastened to the coupler that generates the extraction force, the extraction force causing the assembly component to slide out of the assembly. The tensioner applies an extraction force to the extractor which pulls the assembly component from the assembly.

20 Claims, 7 Drawing Sheets

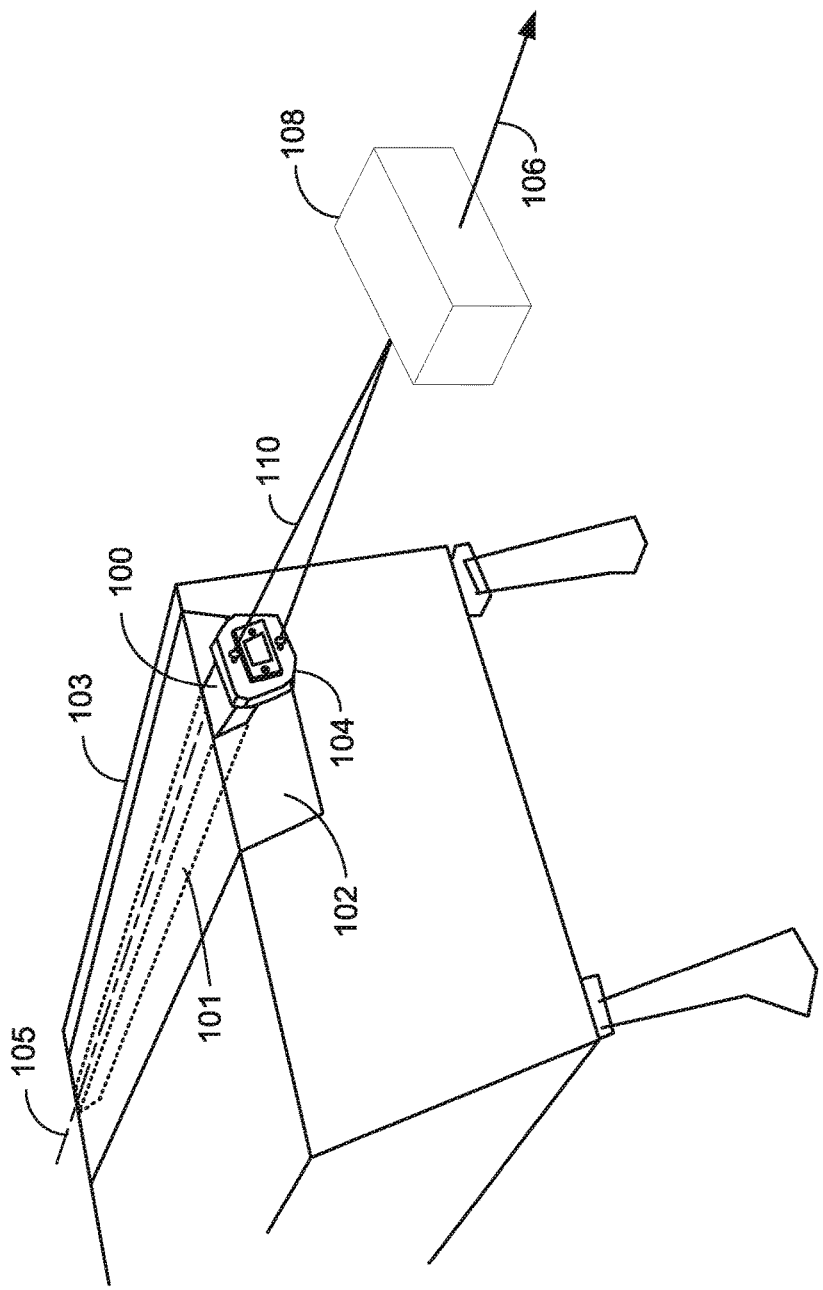

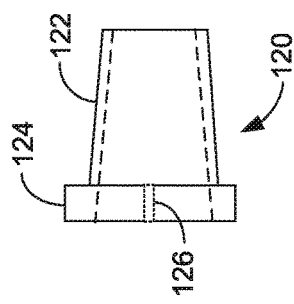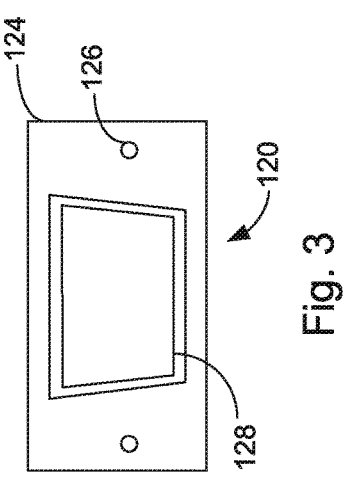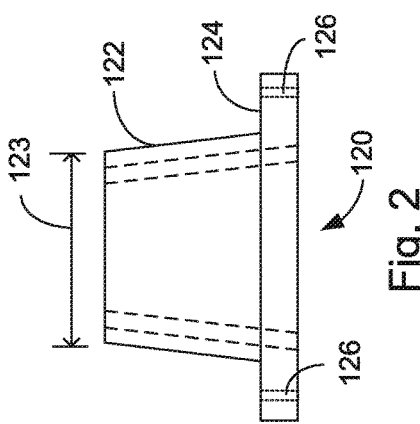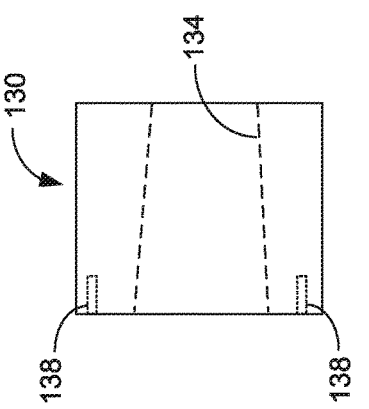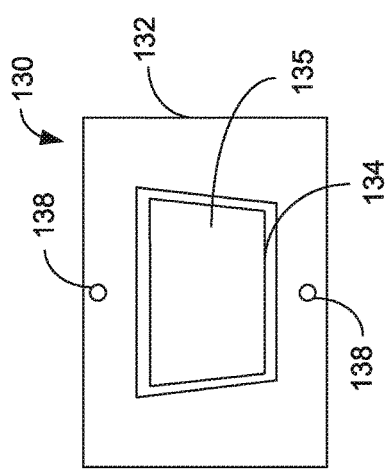

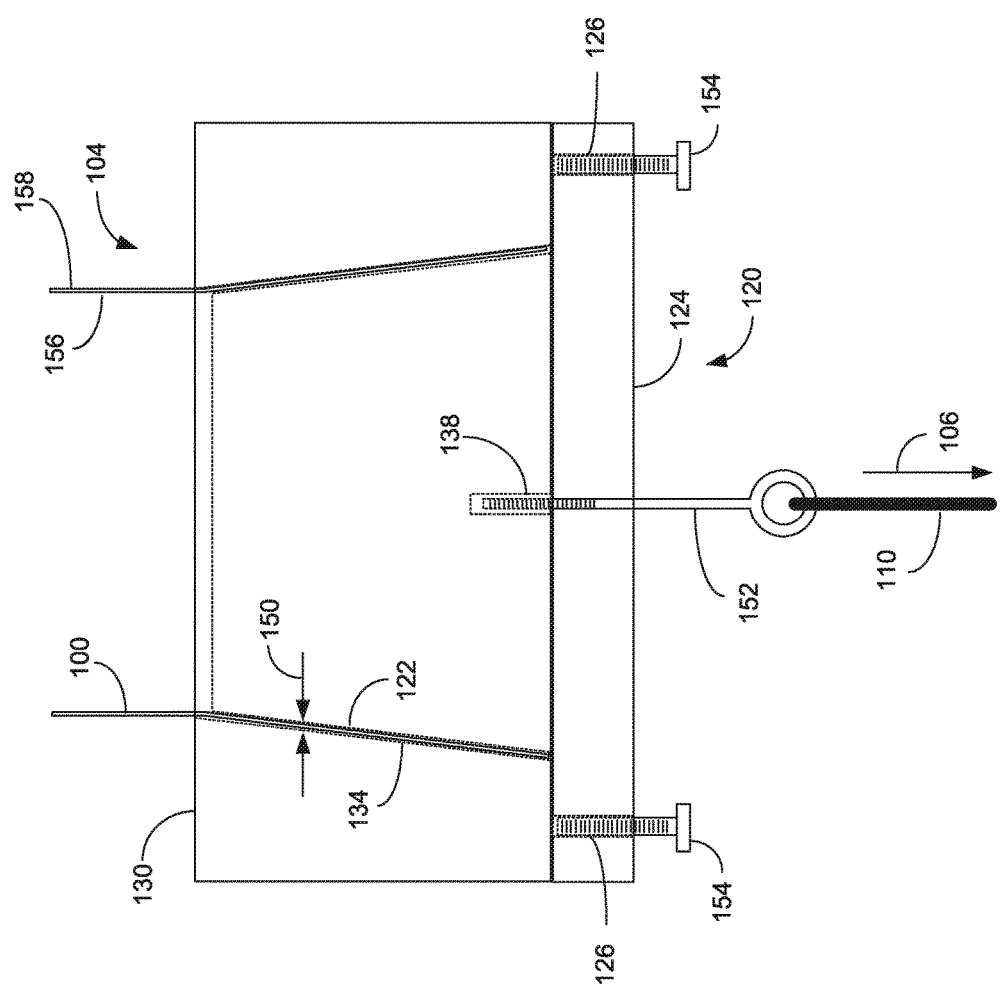

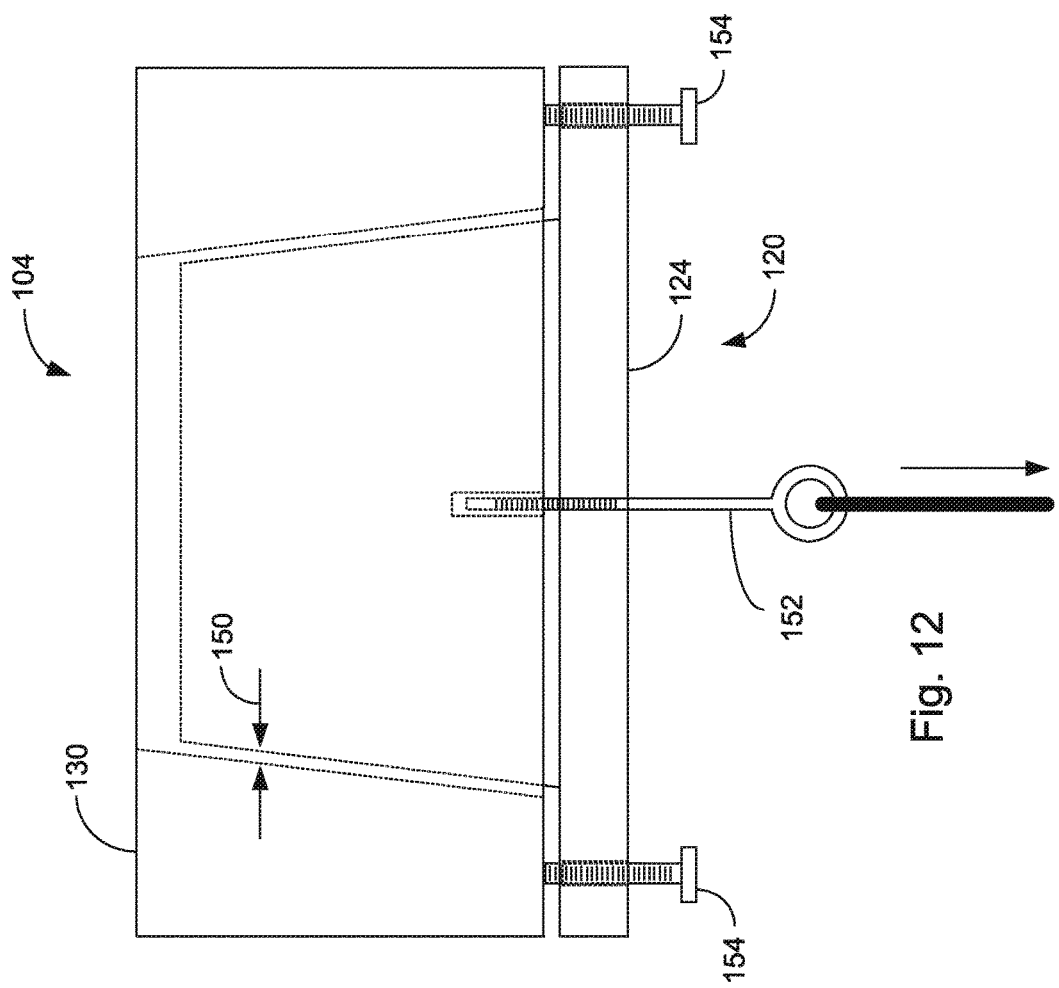

TAPERED EXTRACTION DEVICE

FIELD

This disclosure relates generally to manufacturing operations and more particularly to extracting a reusable assembly component from an assembly used in an aircraft.

BACKGROUND

Modern transportation machines have migrated away from assemblies made of metal, such as aluminum to composite materials to reduce weight and increase strength. The manufacture of these composite materials involves the use of reusable components that may be partially or wholly surrounded by the finished assembly. Removing these reusable components may create a hazard if an attachment slips during removal but alternatively may damage the reusable component if too much gripping force is applied.

SUMMARY

In aspect of the disclosure, an extractor is used with an assembly component where the assembly component has a hollow cross-sectional shape with an exterior surface and an interior surface extending about a longitudinal axis. The extractor includes a sleeve for fitment about the exterior surface of the assembly component and includes an interior wall substantially matching the cross-sectional shape of the exterior surface of the assembly component and having a taper along the longitudinal axis. The extractor also includes a plug for receipt within the assembly component having an exterior wall substantially matching the cross-sectional shape of the interior surface of the assembly component and having a taper along the longitudinal axis. The extractor further includes a coupler for transferring a pulling force to the sleeve to cause the sleeve to shift along the longitudinal axis and cause the taper of the sleeve and plug to reduce a gap there between.

In another aspect of the disclosure, a method of extracting an assembly component from an assembly where the assembly component has a hollow cross-sectional shape with an exterior surface and an interior surface extending about a longitudinal axis includes placing a sleeve over the assembly component, the sleeve having an interior wall substantially matching the cross-sectional shape of the exterior surface of the assembly component. The method also includes placing a plug into an interior of the assembly component, the plug having an exterior wall substantially matching the cross-sectional shape of the interior surface of the assembly component. The method further includes moving the sleeve over the plug to reduce a gap between interior wall of the sleeve and the exterior wall of the plug and applying a force to the sleeve in a direction of extraction to remove the assembly component from the assembly.

In yet another aspect of the disclosure, a system is used for extracting an assembly component from an assembly where the assembly component having a hollow cross-sectional shape with an exterior surface and an interior surface extending about a longitudinal axis. The system includes an extractor that applies a gripping force around a perimeter of the assembly component, the extractor including a coupler that receives an extraction force and a tensioner fastened to the coupler that generates the extraction force so that the extraction force causes the assembly component to release from the assembly.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein:

FIG. 1 is a perspective view illustrating an embodiment of an extractor coupled to an assembly component and assembly in accordance with the current disclosure;

FIG. 2 is a top view of an exemplary plug that is part of the extractor;

FIG. 3 is a front view of the exemplary plug of FIG. 2;

FIG. 4 is a side view of the exemplary plug of FIG. 2;

FIG. 5 is a top view of an exemplary sleeve that is part of the extractor;

FIG. 6 is a front view of the exemplary sleeve of FIG. 5;

FIG. 7 is a side view of the exemplary sleeve of FIG. 5;

FIG. 11 is a top view of an embodiment of the extractor of FIG. 1;

FIG. 12 is a top view of an alternate configuration of the extractor 104 shown in FIG. 11;

Figure 10:
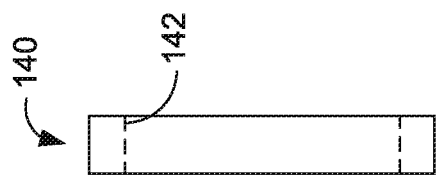
FIG. 10 is a side view of the exemplary collar of FIG. 8.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

An assembly component 100 may be used to create a feature 101, such as a groove or channel in an assembly 102. In various embodiments, the feature 101 may increase the stiffness of the assembly 102, may create a channel for cables or pipes, or both. In one embodiment, the assembly 102 may be stringer for an airplane wing or fuselage (not depicted). The assembly component 100 may be made of a flexible material, such as rubber or another elastic material that is rigid enough to hold its shape during the manufacture of the assembly 102, but that is also able to deform sufficiently to allow the assembly component 100 to be extracted the manufacturing operation is finished. In other embodiments, the assembly component 100 may be more rigid, made of materials such as metal or plastic. The assembly component 100 may be in various shapes to suit the need of the assembly operation and may be a closed tube with various cross sections, such as a circle, square or rhombus, or may be an open structure such as a half pipe or gutter shape. The assembly component generally has a uniform cross-sectional shape along a longitudinal axis 105 and has an exterior surface and an interior surface. In embodiments where the assembly component 100 is reusable, it is desirable to minimize damage to the assembly component 100 during the extraction process. The assembly 102 may be manufactured using a form 103. In an embodiment, the assembly 102 may be a composite material including carbon fiber or other high tensile strength materials.

In order to accomplish extraction while minimizing the potential for damage, an extractor 104 may be used to provide an even gripping pressure around a perimeter of the assembly component 100 so that an extraction force 106 can be transferred via the extractor 104 to the assembly component 100. In an embodiment, the extraction force 106 may be generated by a tensioner 108 such as a winch, a block and tackle, a motorized cart, or other mechanism capable of generating the force necessary to overcome frictional forces that exist between the assembly component 100 and the assembly 102 after completion of the manufacturing process that creates the assembly 102. In an embodiment, the tensioner 108 may be coupled to the extractor 104 via a rope or cable 110.

The extractor 104, in an exemplary embodiment, may have several components. The first, a plug 120, is illustrated in top view, front view and side view in FIGS. 2, 3, and 4, respectively. The top view of FIG. 2 shows a column 122. In an embodiment, the column 122 may be a frustum of 3D object matching a shape of the assembly component 100. For example, if the assembly component 100 is square, the column 122 may be a frustum of a square pyramid. If the assembly component is round, the column 122 may be a frustum of a cone. If the assembly component 100 is a rhombus, as shown in the illustrated embodiment, the column 122 may be the frustum of a rhomboid pyramid. A narrow dimension 123 may be slightly smaller than an opening of the assembly component 100 while the opposite, larger, end may be the same size or slightly larger than the opening of the assembly component 100. The plug 120 may include a flange 124 and threaded holes 126, discussed in more detail below. In one embodiment, the plug 120 may have a hollow core 128 to reduce the weight and ease handling of the plug 120. However, in other embodiments, the plug 120 may be solid.

The extractor 104 may also include a sleeve 130 illustrated by top, front, and side views in FIGS. 5, 6, and 7, respectively. The sleeve 130 may be a hollow column 132 with an interior wall structure 134 defining a tapered center core 135 along an axis 136. The axis 136 may lie along a line of symmetry of the tapered center core 135 and defines an ideal direction of force application to extract the assembly component 100 from the assembly 102. The interior wall structure 134 may be congruent, or at least geometrically similar, to the column 122 of the plug 120 so that the plug 120 can nest inside the interior wall structure 134 of the sleeve 130. In an embodiment, threaded holes 138 may be used to attach a coupler used to apply force to the sleeve, as discussed below with respect to FIG. 11.

In various embodiments, the extractor 104 may be made of aluminum, plastic, stainless steel, or another material that can be suitably milled, cast, or 3D printed and provides sufficient strength to withstand the forces required for extracting the assembly component 100. In some applications, the chemistry of the assembly 102 and/or specific manufacturing requirements may limit the material selection for the extractor 104 to those that are compatible with the assembly 102 and the manufacturing process. In the illustrated embodiment where the assembly 102 is an airplane wing stringer, the extractor 104 may be made of aluminum.

Figure 9:
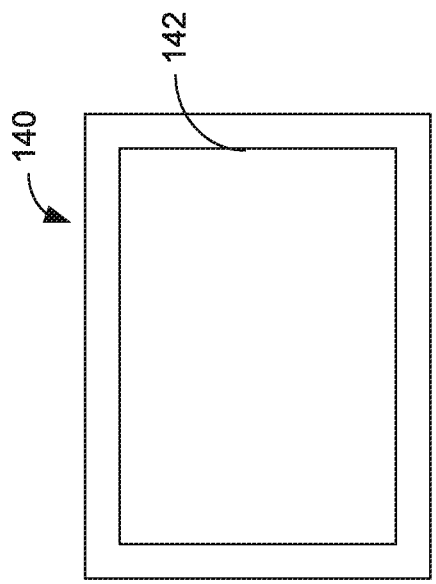
FIG. 9 is a front view of the exemplary collar of FIG. 8.
Figure 8:
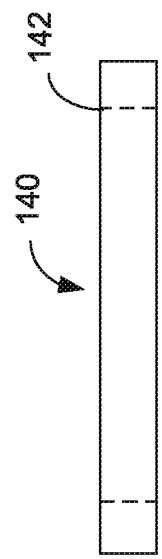
FIG. 8 is a top view of an exemplary collar that may be used with the extractor.

FIGS. 8, 9 and 10 illustrate top, front and side views, respectively, of a collar 140 with an opening 142. The collar 140 may be placed behind the sleeve 130 and attached to a tensioner 108 to provide a generally uniform force against the sleeve during the extraction process. The use of the collar 140 is discussed more below with respect to FIG. 13.

The assembled extractor 104 is illustrated in FIG. 11. The sleeve 130 is first placed over the assembly component 100 pushed far enough above an end of the assembly component so that the plug 120 may be inserted into the assembly component 100. For example, the plug may be inserted until the flange 124 abuts the end of the assembly component 100. The sleeve 130 may then be moved toward the plug 120 so that the facing walls of the interior wall structure 134 of the sleeve 130 and the column 122 of the plug 120 exert a gripping force on the plug 120. FIG. 11 also illustrates an interior surface 156 and an exterior surface 158 of the assembly component 100.

A coupler 152, shown in the embodiment illustrated in FIG. 11 uses an eye bolt screwed into the threaded holes 138 to apply an extraction force collinear with the axis 136. In an embodiment, additional couplers 152 may be added to allow more symmetric application of force to the sleeve 130, as shown in FIG. 1. In other embodiments a threaded rod (not depicted) may be configured as the coupler 152. A rope or cable 110 may be attached between the coupler 152 and a tensioner 108 to transfer the extraction force 106 to the extractor 104 and ultimately to the assembly component 100.

During the extraction operation, the sleeve 130 and plug 120 may become stuck together due to the mechanical wedging of the sleeve 130 and plug 120. In order to simplify separating the two components, release screws 154 are shown screwed into threaded holes 126. The release screws 154 may be further advanced to force the sleeve 130 back away from the plug 120 after the extraction process is completed to allow disassembly of the extractor 104.

In an embodiment, a generally uniform gap 150 is formed between the sleeve 130 and plug 120, which in various embodiments is greater than zero and less than a wall thickness of the assembly component 100. If the gap 150 is too large, not enough compression force, or gripping force, is exerted and the assembly component 100 will slip out of the extractor 104. If the gap 150 is too small, the assembly component 100 may be crushed or tear and become unusable for future assembly operations. In an embodiment, the gap 150 is a desired dimension when the sleeve 130 contacts the flange 124. Also to reduce the risk of damage to the assembly component 100 during the extraction operation, the facing surfaces of the interior wall structure 134 and column 122 may be generally smooth and absent a pattern such as knurling or ridges that might score or weaken the assembly component 100. However, such patterning may be desirable to increase the frictional force exerted on the assembly component 100 for some materials that may be used for the assembly component 100.

Turning to FIG. 12, an alternate embodiment is shown where the release screws 154 are adjusted to a known offset that sets a distance between the sleeve 130 and the flange 124, thereby setting the gap 150 to a desired dimension. By setting the release screws 154 in this fashion, the gap 150 can be adjusted to accommodate different assembly component materials and thicknesses.

Figure 13:
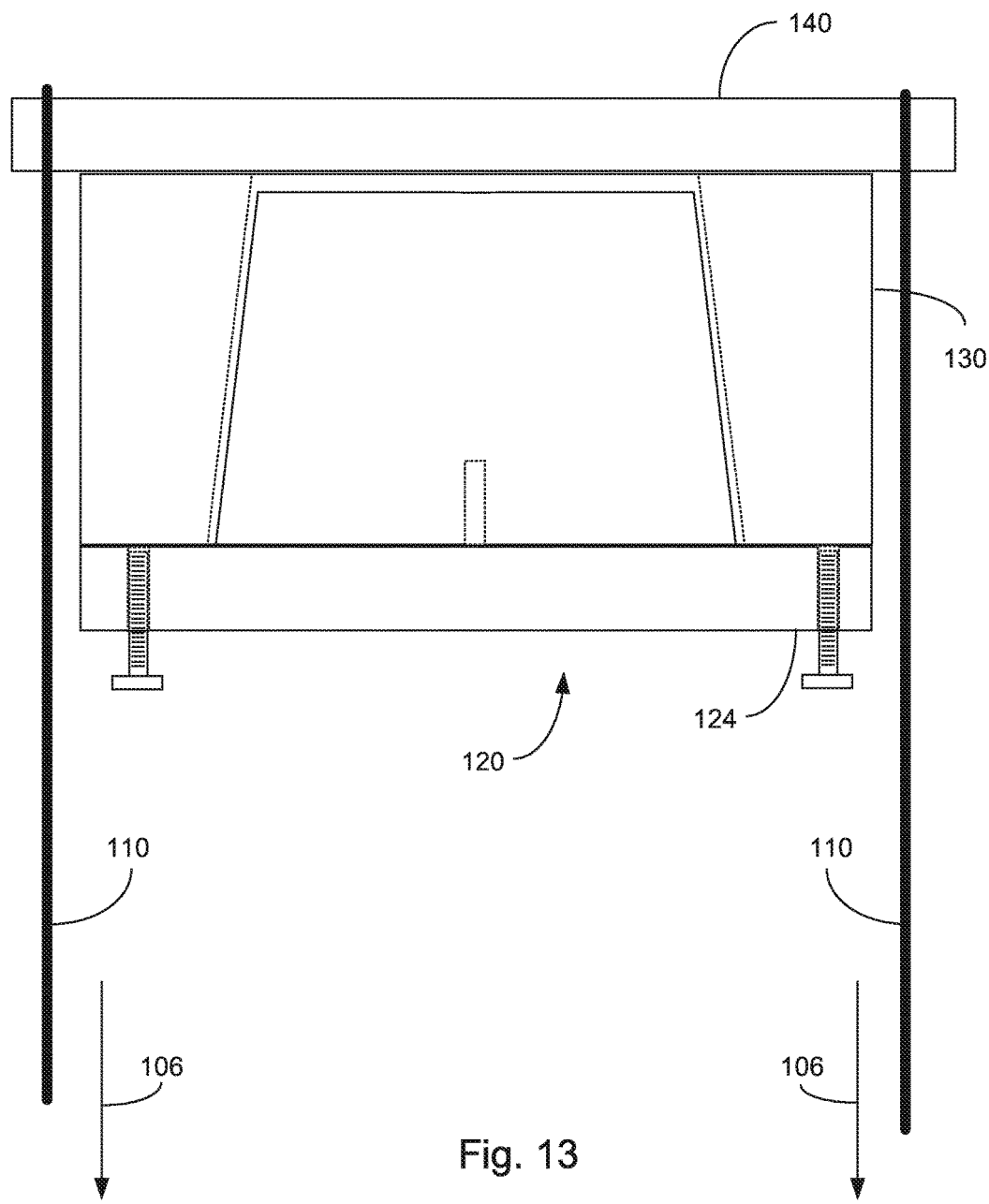
FIG. 13 is a top view of an alternate embodiment of the extractor 104 using the collar.

Yet another embodiment of the extractor 104 is illustrated in FIG. 13. In this embodiment, instead of a threaded coupler 152, an alternate coupler in the form of a collar 140 is placed against the sleeve 130 on a side opposite the plug 120 so that the collar rests against this back side of the sleeve 130. One or more ropes or cables 110 may be attached to the collar 140 to provide an even force that moves the sleeve 130 over the plug 120.

Figure 14:
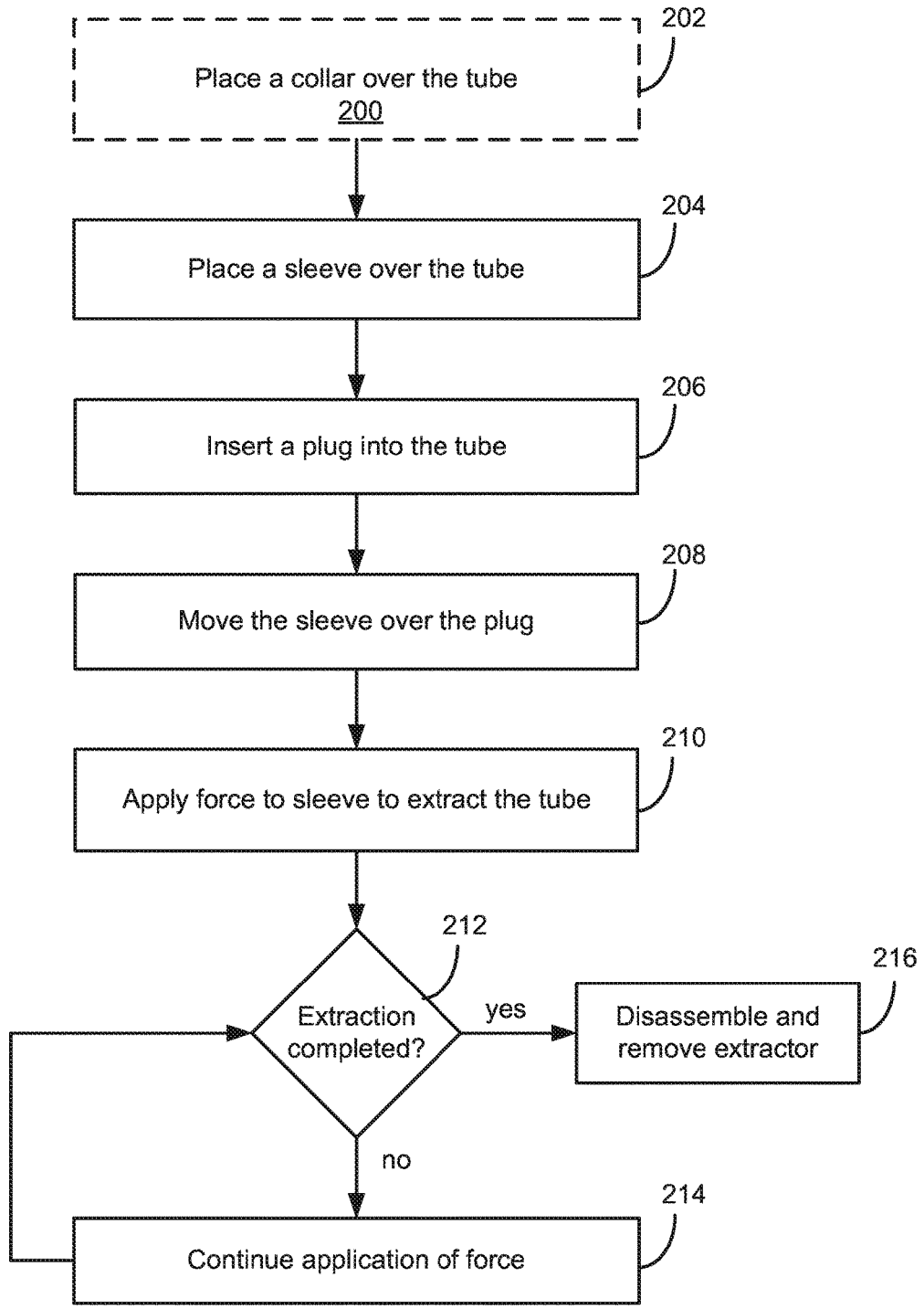
FIG. 14 is an illustration of operations performed by one embodiment that uses an extractor to remove an assembly component from an assembly in accordance with the current disclosure.

FIG. 14 is a flowchart of a method 200 of extracting an assembly component 100 from an assembly 102. Optionally, at block 202, a collar 140 may be placed over the assembly component 100, when the collar 140 is used to apply force to the sleeve 130 instead of a threaded coupler 152. At block 204, the sleeve 130 may be placed over the assembly component 100 so that, at block 206, the plug 120 may be inserted into the assembly component 100. In an embodiment, the plug 120 may be inserted until a flange 124 of the plug 120 contacts an end of the assembly component 100.

At block 208, the sleeve 130 is moved toward the plug 120 so that the facing surfaces of the sleeve 130 and plug 120 wedge together against outer and inner surfaces, respectively, of the assembly component 100. In an embodiment, the sleeve 130 may be moved toward the plug 120 so that the sleeve 130 contacts the flange 124, setting a gap 150 between the interior wall structure 134 and the column 122.

At block 210, an extraction force 106 may be applied to the sleeve 130 collinear with the axis 136 of the sleeve 130 so that the assembly component 100 is drawn out of the assembly 102. Different embodiments of tensioner 108 may be used to apply the extraction force 106. In one embodiment, a motorized cart (not depicted) may be driven along a course that draws the assembly component 100 out of the assembly 102. In another embodiment, the force may be applied by a winch or a block and tackle mounted at a fixed point.

A determination is made at block 212 whether the assembly component 100 has been fully extracted. If not, the 'no' branch is taken to block 214 and the application of the extraction force 106 is continued, returning to block 212. If, at block 212, the assembly component 100 is fully removed from the assembly 102, the 'yes' branch may be taken to block 216.

At block 216, the extractor 104 may be disassembled into the component parts of the sleeve 130 and plug 120. In an embodiment, the release screws 154 may be screwed through the flange 124 to force the sleeve 130 away from the plug 120, releasing the assembly component 100. In an embodiment, the extractor 104 may be considered part of a system that includes a coupler 152 and a tensioner 108. The extractor 104 is used to apply a uniform gripping force around a perimeter of the assembly component 100 using overlapping sleeve 130 and plug 120 components.

The use of an extractor 104 for the removal of the assembly component 100 from the assembly 102 benefits the manufacturers of composite materials by increasing productivity using a simple, repeatable process for assembly component extraction. At the same time, the use of the extractor 104 minimizes damage to the assembly component 100, prolonging its life and reducing overall manufacturing costs.

While only certain embodiments have been set forth, alternatives and modifications will be apparent from the above description to those skilled in the art. These and other alternatives are considered equivalents and within the spirit and scope of this disclosure and the appended claims.

What is claimed:

1. An extractor for use with an assembly component, the assembly component having a cross-sectional shape that is hollow with an exterior surface and an interior surface extending about a longitudinal axis, the extractor comprising:
    a sleeve having an interior wall matching the cross-sectional shape of, and sized to engage, the exterior surface of the assembly component, the interior wall of the sleeve having a taper along the longitudinal axis;
    a plug having an exterior wall matching the cross-sectional shape of, and sized to engage, the interior surface of the assembly component, the exterior wall of the plug having a taper along the longitudinal axis, wherein a gap is formed between the exterior wall of the plug and the interior wall of the sleeve, the gap being less than a wall thickness of the assembly component; and
    a coupler for transferring a pulling force to the sleeve.

2. The extractor of claim 1, wherein the plug further comprises a flange positioned to engage an end of the sleeve located adjacent the plug, thereby setting a minimum dimension of the gap.

3. The extractor of claim 2, wherein the flange defines a threaded hole sized to threadably receive a release screw, the release screw being sized to engage the end of the sleeve adjacent the plug, thereby to increase a dimension of the gap.

4. The extractor of claim 1, wherein the coupler includes a threaded rod mechanically fastened to the sleeve.

5. The extractor of claim 1, wherein the coupler includes an eye bolt mechanically fastened to the sleeve.

6. The extractor of claim 1, wherein the coupler comprises a collar engaging an end of the sleeve located opposite the plug.

7. The extractor of claim 1, wherein facing surfaces of the interior wall of the sleeve and the exterior wall of the plug are smooth and absent a pattern.

8. The extractor of claim 1, wherein the gap between the exterior wall of the plug and the interior wall of the sleeve is uniform.

9. An extractor for use with an assembly component, the assembly component having a cross-sectional shape that is hollow with an exterior surface and an interior surface extending about a longitudinal axis, the extractor comprising:
    a sleeve having an interior wall sized to engage the exterior surface of the assembly component and having a taper along the longitudinal axis;
    a plug having an exterior wall sized to engage the interior surface of the assembly component and having a taper along the longitudinal axis, wherein a uniform gap is formed between the exterior wall of the plug and the interior wall of the sleeve, the uniform gap being less than a wall thickness of the assembly component; and
    a coupler for transferring a pulling force to the sleeve.

10. The extractor of claim 9, wherein the plug further comprises a flange positioned to engage an end of the sleeve located adjacent the plug, wherein engagement of the end of the sleeve adjacent the plug with the flange sets a minimum dimension of the uniform gap.

11. The extractor of claim 10, wherein the flange defines a threaded hole sized to threadably receive a release screw, the release screw being sized to engage the end of the sleeve adjacent the plug, thereby to increase a dimension of the uniform gap.

12. The extractor of claim 9, wherein facing surfaces of the interior wall of the sleeve and the exterior wall of the plug are smooth and absent a pattern.

13. An extractor for use with an assembly component, the assembly component having a cross-sectional shape that is hollow with an exterior surface and an interior surface extending about a longitudinal axis, the extractor comprising:
- a sleeve having an interior wall sized to engage the exterior surface of the assembly component and having a taper along the longitudinal axis;
- a plug having:
    - an exterior wall sized to engage the interior surface of the assembly component and having a taper along the longitudinal axis; and
    - a flange positioned to engage an end of the sleeve located adjacent the plug;
    - wherein a gap is formed between the exterior wall of the plug and the interior wall of the sleeve, and engagement of the end of the sleeve adjacent the plug with the flange sets a minimum dimension of the gap; and
- a coupler for transferring a pulling force to the sleeve.

14. The extractor of claim 13, wherein the gap is less than a wall thickness of the assembly component.

15. The extractor of claim 13, wherein the flange defines a threaded hole sized to threadably receive a release screw, the release screw being sized to engage the end of the sleeve adjacent the plug, thereby to increase a dimension of the gap.

16. The extractor of claim 13, wherein the coupler includes a threaded rod mechanically fastened to the sleeve.

17. The extractor of claim 13, wherein the coupler includes an eye bolt mechanically fastened to the sleeve.

18. The extractor of claim 13, wherein the coupler comprises a collar engaging a an end of the sleeve located opposite the plug.

19. The extractor of claim 13, wherein facing surfaces of the interior wall of the sleeve and the exterior wall of the plug are smooth and absent a pattern.

20. The extractor of claim 13, wherein the gap between the exterior wall of the plug and the interior wall of the sleeve is uniform.

* * * * *